United States Patent
Edelmann

(10) Patent No.: US 9,751,208 B2
(45) Date of Patent: Sep. 5, 2017

(54) ROBOTIC DEVICE AND LABORATORY AUTOMATION SYSTEM COMPRISING ROBOTIC DEVICE

(71) Applicant: Roche Diagnostics Operations, Inc., Indianapolis, IN (US)

(72) Inventor: Matthias Edelmann, Weinheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 78 days.

(21) Appl. No.: 15/040,383

(22) Filed: Feb. 10, 2016

(65) Prior Publication Data
US 2016/0229051 A1    Aug. 11, 2016

(30) Foreign Application Priority Data
Feb. 10, 2015  (EP) .................................... 15154519

(51) Int. Cl.
| | |
|---|---|
| *B25J 9/04* | (2006.01) |
| *B65G 47/90* | (2006.01) |
| *B25J 9/00* | (2006.01) |
| *B25J 9/10* | (2006.01) |

(52) U.S. Cl.
CPC ............. *B25J 9/044* (2013.01); *B25J 9/0021* (2013.01); *B25J 9/042* (2013.01); *B25J 9/1065* (2013.01); *B65G 47/902* (2013.01); *B65G 47/905* (2013.01)

(58) Field of Classification Search
CPC . B25J 9/042; B25J 9/044; B25J 9/0021; B25J 9/1065
See application file for complete search history.

(56) References Cited

U.S. PATENT DOCUMENTS

| | | | | |
|---|---|---|---|---|
| 3,031,906 A | * | 5/1962 | Holman | B29D 30/0016 414/744.5 |
| 4,620,831 A | * | 11/1986 | Poncet | B25J 9/044 414/744.3 |
| 4,947,702 A | * | 8/1990 | Kato | B25J 9/042 901/17 |
| 4,978,274 A | * | 12/1990 | de Groot | B25J 9/042 414/744.3 |
| 5,085,556 A | * | 2/1992 | Ohtomi | B25J 9/042 414/744.3 |

(Continued)

FOREIGN PATENT DOCUMENTS

| | | |
|---|---|---|
| DE | 202005017588 U1 | 2/2006 |
| EP | 2148206 A1 | 1/2010 |

*Primary Examiner* — Gerald McClain
(74) *Attorney, Agent, or Firm* — Roche Diagnostics Operations, Inc.

(57) ABSTRACT

A robotic device is presented. The robotic device comprises a stationary base, a first arm rotationally mounted on the base for rotation about a first axis (I), a second arm rotationally mounted on the first arm for rotation about a second axis (II), in which second axis (II) is parallel to the first axis (I), a first driving device for driving the first arm to rotate about the first axis (I), and a second arm drive unit with a second driving device for driving the second arm to rotate about the second axis (I). The first driving device and the second driving devices are mounted stationary at the base. A linear drive unit moves the first arm and the second arm in a direction parallel to the first axis (I) and the second axis (II). The linear drive unit comprises a third driving device mounted stationary at the base.

12 Claims, 3 Drawing Sheets

(56) References Cited

U.S. PATENT DOCUMENTS

| | | |
|---|---|---|
| 5,741,113 A | 4/1998 | Bacchi et al. |
| 6,394,740 B1 * | 5/2002 | Derby .................. B25J 9/042 414/744.1 |
| 7,347,120 B2 | 3/2008 | Friedrich et al. |
| 2008/0041183 A1 | 2/2008 | Todorov |
| 2011/0135426 A1 | 6/2011 | Shunsuke et al. |

* cited by examiner

ROBOTIC DEVICE AND LABORATORY AUTOMATION SYSTEM COMPRISING ROBOTIC DEVICE

CROSS-REFERENCE TO RELATED APPLICATIONS

This application is a continuation of EP 15154519.1, filed Feb. 10, 2015, which is hereby incorporated by reference.

BACKGROUND

The present disclosure generally relates to a robotic device and to a laboratory automation system comprising a laboratory device.

A laboratory automation system comprises a number of pre-analytical, analytical and/or post-analytical stations, in which samples, for example blood, saliva, swab and other specimens taken from the human body, are processed. It is generally known to provide test tubes containing the samples. The test tubes are also referred to as sample tubes. Several test tubes can be placed in so-called racks for an efficient handling. The laboratory automation system may comprise one or more robotic devices for handling individual test tubes or racks. A robotic device for handling racks are known like the SCARA type robotic device comprising two arms or links, which are swivelable about two parallel axes.

A robot device of the SCARA type comprises a stationary base, a first arm mounted on the base swivelably about a first axis, a second arm mounted on the first arm swivelably about a second axis, and motors for driving the arms. A first motor for driving both arms with respect to the base is arranged in the base. A second motor for driving the second arm relative to the first arm is received in the second arm. A work unit is provided at a distal end of the second arm, which comprises a spindle displaceable in its longitudinal direction for moving an object in the vertical direction. The second motor arranged on the arm is a load, which has to be moved by the first motor driving both arms. Hence, powerful motors are required and the arms have a large space requirement.

Another SCARA type robotic device comprises two concentric motors arranged at a base and a complex transmission system for selectively driving one or both of the two arms by means of the two concentric motors.

Therefore, there is a need for a lightweight robotic device for use in a laboratory automation system that has a small space requirement.

SUMMARY

According to the present disclosure, a robotic device is presented. The robotic device can comprise a stationary base, a first arm rotationally mounted on the base for rotation about a first axis (I), a second arm rotationally mounted on the first arm for rotation about a second axis (II) where the second axis (II) is parallel to the first axis (I), a first driving device for driving the first arm to rotate about the first axis (I), and a second arm drive unit with a second driving device for driving the second arm to rotate about the second axis (I). The first driving device and the second driving devices can be mounted stationary at the base. The robotic device can further comprise a linear drive unit for moving the first arm and the second arm in a direction parallel to the first axis (I) and the second axis (II). The linear drive unit can comprise a third driving device mounted stationary at the base.

Accordingly, it is a feature of the embodiments of the present disclosure to provide a lightweight robotic device for use in a laboratory automation system that has a small space requirement. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
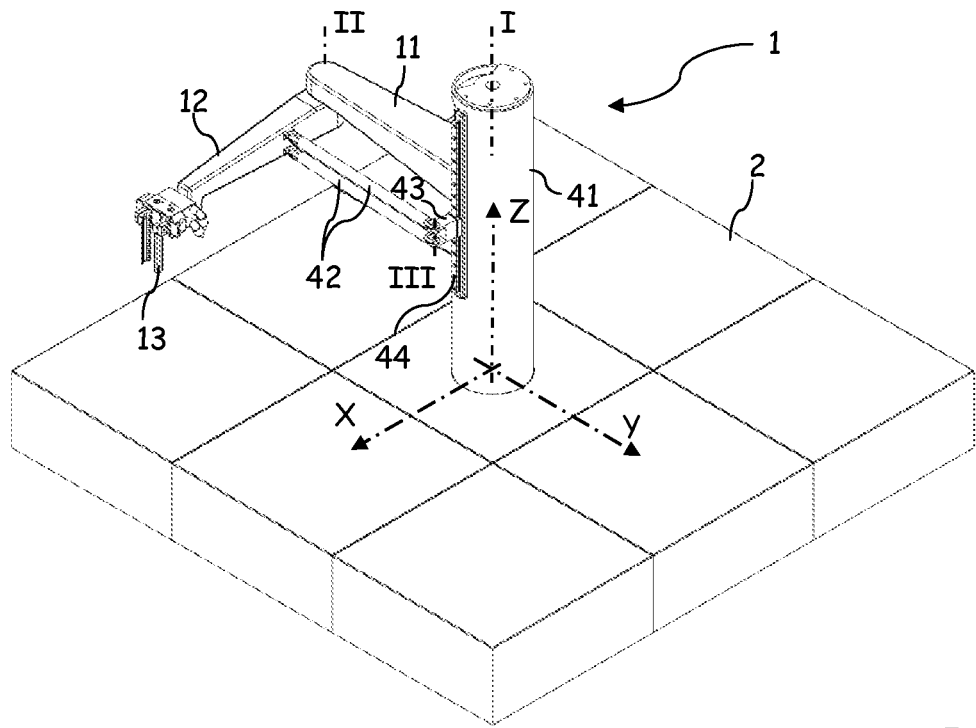
FIG. 1 illustrates a perspective view of a robotic device according to an embodiment of the present disclosure.
Figure 2:
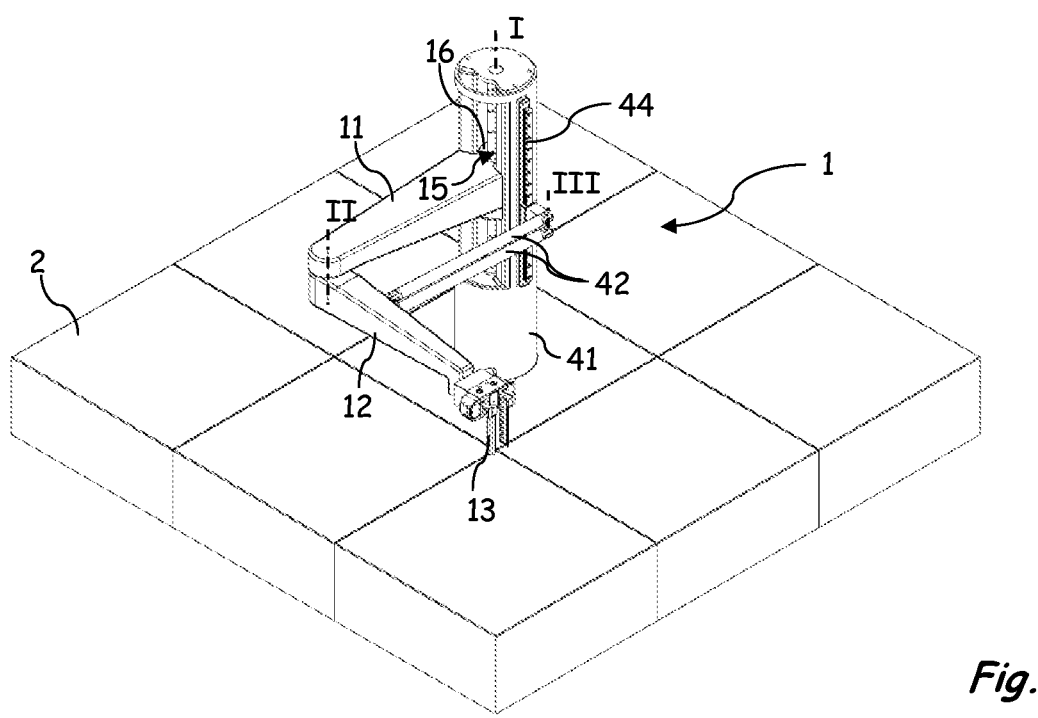
FIG. 2 illustrates a perspective view of the robotic device of FIG. 1 rotated through 90° according to an embodiment of the present disclosure.
Figure 3:
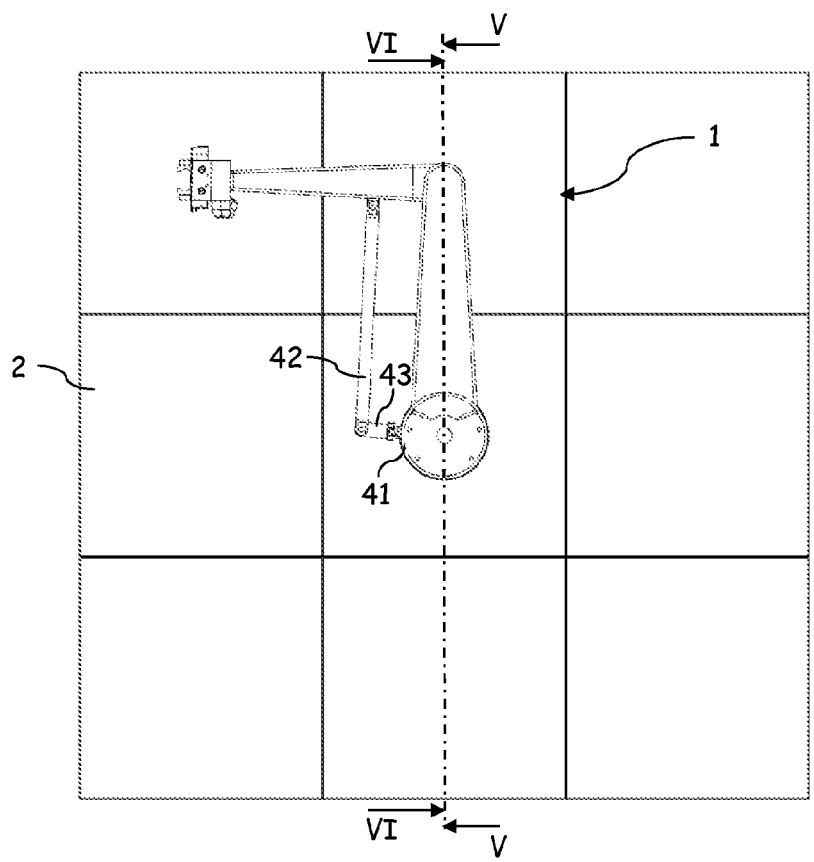
FIG. 3 illustrates a top view of the robotic device of FIG. 1 according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A robotic device is provided. The robotic device can comprise a stationary base, a first arm rotationally mounted on the base for rotation about a first axis, a second arm rotationally mounted on the first arm for rotation about a second axis in which the second axis can be parallel to the first axis, a first driving device for driving the first arm to rotate about the first axis, a second arm drive unit with a second driving device for driving the second arm to rotate about the second axis, and a linear drive unit for moving the first arm and the second arm in a direction parallel to the first and the second axis. The first driving device and the second driving device can be mounted stationary at the base. The linear drive unit can comprise a third driving device mounted stationary at the base.

In other words, three driving devices can be provided for positioning the robotic device, in particular the distal end of the second arm, in the three-dimensional space, i.e., in the X-, Y- and Z-direction in Cartesian space. In one embodiment, the stationary base can be oriented in such manner that the first and the second axis can be vertical axes and the linear drive unit can be designed to lift and to lower the first and the second arm.

As the first, the second, and the third driving device can be all mounted stationary at the base and not carried by the arms, the masses to be accelerated for the positioning of the robotic device can be lower than in prior art devices. As driving devices are sized among others on the basis of the masses to be accelerated, smaller driving devices may be used. Further, as the arms do not carry the driving devices, less voluminous arms may be used.

In one embodiment, the linear drive unit can comprise a single acting or double acting pneumatic or hydraulic cylinder. In some embodiments, the third driving device can be an electric motor such as, for example, a servomotor allowing for a simple control and a high positioning accuracy. In one embodiment, the electric motor can drive a pinion engaging with a rack mounted on the first arm for moving the first arm.

In some embodiments, the linear drive unit can comprise a threaded rod rotating about a fixed third axis and at least one nut engaging the threaded rod, which at least one nut can be mounted on the first arm. By providing a threaded rod rotating about a fixed axis, the space requirement of the robotic device in the direction of the third axis can be minimized. In particular, a space requirement in the direction of the first axis, typically the vertical axis, is less than that of known devices, in which a threaded rod is provided at the distal end of the second arm, which threaded rod is axially moveable for lifting or lowering a gripper.

Preferably, the third axis can be coaxial with the first axis. This can allow a compact design.

In some embodiments, the first arm can be mounted to the base by a first column driven to rotate about the first axis. The first arm can be non-rotatably, but axially displaceably coupled to the first column. In one embodiment, the first arm can comprise a slider element slidingly mounted in a guiding groove of the first column extending in the direction of the first axis and positively connected to the first column to rotate with the first column. By use of the slider element, a dovetail-like connection of the first arm and the column can be provided with a necking area adjacent to the slider element. A torque can be transmitted at flanks of the necking area. In order to allow for a movement in of the slider element along the guiding groove without jamming, in some embodiments the slider element can have a substantially circular cross-section.

In some embodiments, the first column can have a hollow profile. In one embodiment, the first column is a hollow profile, wherein the threaded rod of the linear drive unit can be arranged inside the first column such as, for example, coaxially to the first column.

According to one embodiment, the second drive unit can comprise a second column driven to rotate about the first axis. In one embodiment, the second column can have a hollow profile, wherein the first column can be arranged inside the second column, such that the second column can be rotatable about the first column. By a movement of one or both of the first and the second column, the arms of the robotic device can be positioned in a plane perpendicular to the first and the second axis.

In one embodiment, a movement of the second column can be transmitted to the second arm by a belt system.

In some embodiments, the second arm can be linked to the second column by a linkage system comprising at least one rod, which can be rotatably about a rod axis parallel to the first axis and axially displaceably mounted on the second column. Such a linkage system can allow for a reliable transmission of the rotation to the second arm, which may not be prone to errors.

In one embodiment, the at least one rod can be directly coupled to the second column, wherein, for example, a bracket can be provided that can extend in parallel to the first axis and the rod can be slidingly and rotatably coupled to the bracket. In one embodiment, the linkage system can further comprise at least one cantilever, which can be non-rotatably, but axially displaceably in the axial direction of second column coupled to the second column, wherein the at least one rod can be rotatably about the rod axis and axially fixed coupled to the cantilever. The cantilever can protrude radially from the second column and can allow a positioning of the rod axis at a distance of the first axis without significantly increasing the overall space requirement of the second column.

In one embodiment, at least one guiding rail extending in parallel to the first axis can be provided at the outer surface of the second column, wherein the at least one cantilever can be slidingly coupled to the at least one guiding rail.

As explained, by the three driving devices the robotic device, in particular a distal end of the second arm, can be positioned in the three-dimensional space. In one embodiment, at least one control device can be provided, wherein the first driving device, the second driving device, and the third driving device can be coordinated by the control device to position the robotic device in Cartesian space.

In some embodiments, a work unit such as, for example, a gripper, can be attached to the second arm. In this case, the control device can control the driving devices to position the work unit attached to the second arm in Cartesian space.

The work unit in some embodiment can be mounted moveable on the second arm, in particular swiveleable with respect to the second arm.

A laboratory automation system with a number of pre-analytical, analytical and/or post-analytical stations and with a robotic device can be provided, in which the robotic device can comprise a stationary base, a first arm rotationally mounted on the base for rotation about a first axis, a second arm rotationally mounted on the first arm for rotation about a second axis, which second axis can be parallel to the first axis, a first driving device for driving the first arm to rotate about the first axis, a second arm drive unit with a second driving device for driving the second arm to rotate about the second axis, and a linear drive unit for moving the first arm and the second arm in a direction parallel to the first and the second axis. The first driving device and the second driving devices are mounted stationary at the base, and wherein the linear drive unit comprises a third driving device mounted stationary at the base.

In one embodiment, the robotic device can comprise two nested columns and a threaded rod arranged inside and coaxially to the columns. The two nested columns and the threaded rod can be driven by the first, the second and the third driving device, respectively for positioning the robotic device in Cartesian space.

FIGS. 1 to 6 show in schematic drawings an embodiment of a robotic device 1 used, for example, in a laboratory automation system for handling test tubes.

The robotic device 1 can comprise a stationary base 10 (shown in FIGS. 5 and 6), a first arm 11 rotationally mounted on the base 10 for rotation about a first axis I, and a second arm 12 rotationally mounted on the first arm 11 for rotation about a second axis II, in which second axis II is parallel to the first axis I. At a distal end of the second arm 12, a work unit such as, for example, a gripper 13 can be provided. The gripper 13 can be mounted rotatably on the second arm 12.

In the embodiment shown, the base 10 can be arranged stationary underneath a working table 2. In other embodiments, the base 10 can be provided above the working table 2 or the robotic device 1 can be used without any working table. The base 10, in one embodiment, can comprise a housing. In other embodiments, the base 10 can be integrated in the environment.

The first arm 11 can be mounted to the base 10 by a first column 14, in which first column 14 can be driven to rotate about the first axis I by a first driving device 30. In the embodiment shown, the first driving device 30 can be an electric motor. Between the first driving device 30 and the first column 14 a gearing system can be provided.

The first arm 11 can be non-rotatably, but axially displaceably along the first axis I coupled to the first column 14.

Figure 4:
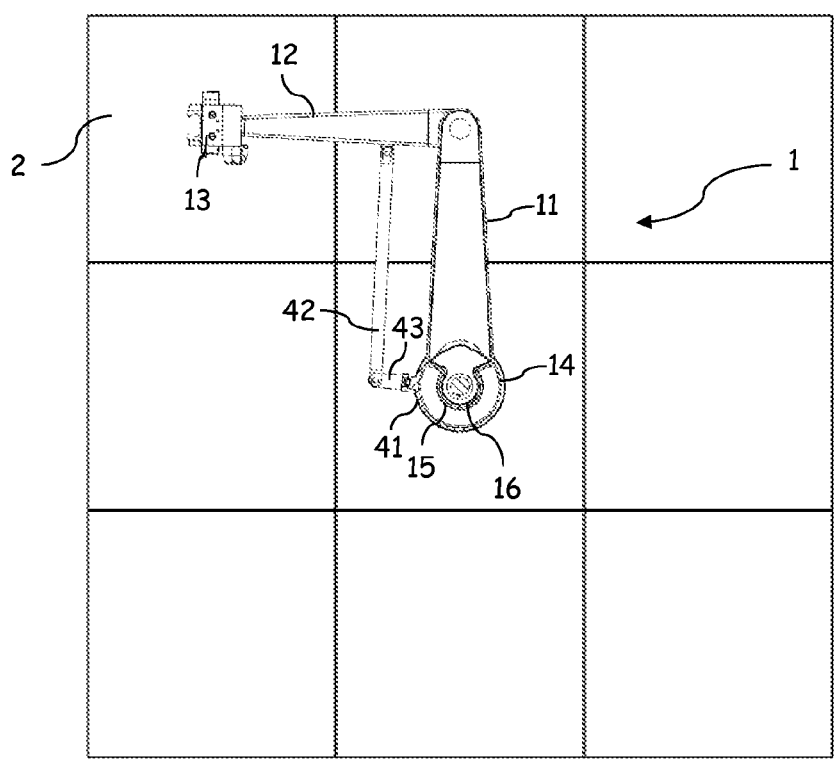
FIG. 4 illustrates a horizontal section view of the device of FIG. 1 according to an embodiment of the present disclosure.
Figure 5:
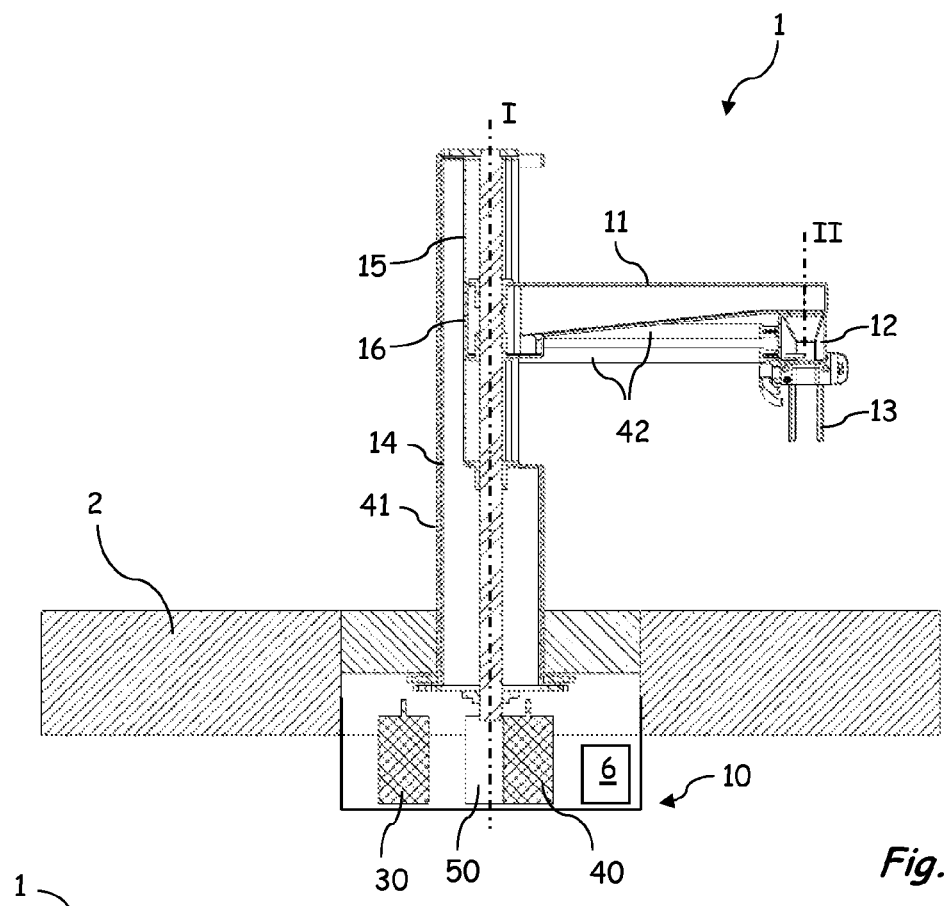
FIG. 5 illustrates a vertical section view along line V-V of FIG. 3 according to an embodiment of the present disclosure.
Figure 6:
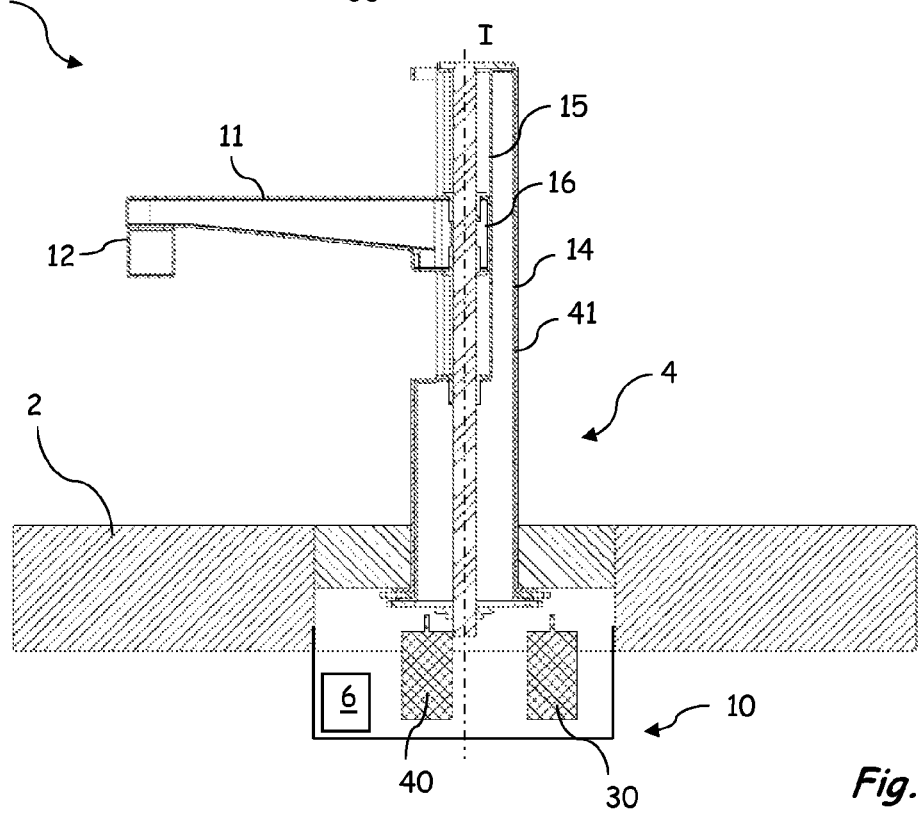
FIG. 6 illustrates a vertical section view along line VI-VI of FIG. 3 according to an embodiment of the present disclosure.

As can be best seen in the horizontal section view of FIG. 4, the first column 14 can be a hollow profile provided with a guiding groove 15 extending in the direction of the first axis I. The first arm 11 can comprise a slider element 15 slidingly mounted in the guiding groove 15 of the first column. The guiding groove 15 can be undercut, i.e., its opening can be smaller than its maximum width and the slider element 15 can be retained in radial direction in the guiding groove 14. A necking can be formed at the first arm 11 adjacent to the slider element 15. The flanks of the necking can abut flanks of the first column 14 to positively connect the first arm 11 to the first column 14 for rotation with the first column 14.

A second arm drive unit 4 with a second driving device 40 can be provided for driving the second arm 12 to rotate with respect to the first arm 11 about the second axis II. In the embodiment shown, the second arm drive unit 4 can comprise a second column 41. The second column 41 can be a hollow profile. The first column 14 and the second column 41 can be arranged coaxially, wherein the first column 14 can be arranged inside the second column 14, such that the second column 41 can be rotatable about the first column 14. The second column 41 can be provided with a cutout for the first arm 11, which can be designed to allow a rotation of the second column 41 with respect to the first column 14 without an interference of the second column 41 and the first arm 11.

The second column 41 can be driven to rotate about the first axis I by the second driving device 40. In the embodiment shown, the second driving device 40 can be an electric motor. Between the second driving device 40 and the second column 41 a gearing system can be provided. The rotation of the second column 41 can be transferred to the second arm 12 by a linkage system. In the figures, the second arm 12 can be linked to the second column 41 by a linkage system comprising two rods 42 arranged in parallel in a common plane parallel to the first axis I. The rods 42 can be rotatably about a rod axis III parallel to the first axis I and axially displaceably mounted on the second column 41. For this purpose, the linkage system shown can further comprise a cantilever 43. The cantilever 43 can be non-rotatably, but axially displaceably coupled to the second column 41 by guiding rail 44 extending in parallel to the first axis I at the outer surface of the second column 41. The two rods 42 can be rotatably about the rod axis III and axially fixed coupled to cantilever 43.

A control device 6 can be provided. By the control device 6, the first driving device 30 and the second driving device 40 can be either conjointly or separately driven to position the gripper 13 in the plane perpendicular to the first axis I and the second axis II, In other words, when choosing a Cartesian coordinate system having its origin at the intersection of the working table 2 and the first axis I and a vertical Z-axis, the gripper 13 can be positioned in the X-axis and the Y-axis.

The robotic device 1 can further comprise a linear drive unit 5 for moving the first arm 11 and the second arm 12 in a direction parallel to the first axis I and the second axis II, i.e. along the Z-axis of the Cartesian space.

The linear drive unit 5 can comprise a third driving device 50 driving a threaded rod 51 arranged at a fixed position to rotate about an axis. In the embodiment shown, the threaded rod 51 can be arranged inside the first column 14 and coaxially to the first axis I. Hence, the threaded rod 51 can be driven to rotate about the first axis I.

The first arm 11, for example, the slider element 16 of the first arm 11, can be provided with two nuts 52 engaging the threaded rod 51.

The control device 6 can control the first driving device 30 and the third driving device 50 to drive the threaded rod 51 and/or the first column to rotate about the first axis I.

When driving the threaded rod 51 to rotate about the first axis I and blocking a rotation of the first column 14 and, hence, the slider element 16 non-rotatably coupled to the first column 14, the slider element 16 and, thus, the first arm 11 can travel along the threaded rod 41. The second arm 12 mounted to the first arm 11 can be dragged to move with the first arm 14, wherein the cantilever 43 can travel along the guiding rail 44.

The maximum travel length of the first arm 11 along the threaded rod 41 can be defined by the length of the guiding groove 15. In the figures, the guiding groove 15 may not reach over the entire length of the first column 14. Hence, a solid limit stop can be provided, which can limit a movement of the gripper 13 towards the working table 2 and can prevent the gripper 13 from coming into collision with the working table 2.

When driving the threaded rod 51 and the first column 14 to rotate about the first axis I with coordinated angular velocities, the threaded rod 51 and the first arm 11 can rotate conjointly about the first axis I for rotationally positioning the first arm 11 without lifting or lowering the first arm 11.

All three driving devices 30, 40, 50 can be mounted stationary at the base 10. Hence, the arms 11, 12 may not have to carry the load of the driving devices 30, 40, 50. This can allow for a lightweight construction of the arms 11, 12, for example, as hollow profiles as shown in the figures. A further driving device may be provided for driving the gripper 13 to rotate with respect to the second arm 12.

The threaded rod 51, the first column 14 and the second column 41 can be arranged coaxially and can be, at least substantially aligned in the axial direction. For this purpose, the first column 14 and the second column 41 can be designed as hollow profiles, wherein the threaded rod 51 can be rotatably received by the first column 14, which can be rotatably received by the second column 41. The first column 14 and the second column 41 can both have a circular cross section for allowing a rotation with respect to one another with a minimum space requirement.

The robotic device 1 in one embodiment can be used in a laboratory automation system for handling test tubes. The lightweight design of the robotic device 1 can allow a handling of the test tubes at high velocities and high accelerations and with high precision and inducing only minor vibrations.

Of course, the use of the robotic device 1 can be neither limited to pick-and-place operations nor to a use in a laboratory automation system. Other working units than the gripper 13 can be attached to the distal end of the second arm 12 for adapting the robotic device 1 to different operations.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A robotic device, the robotic device comprising:
   a stationary base;
   a first arm rotationally mounted on the base for rotation about a first axis (I);
   a second arm rotationally mounted on the first arm for rotation about a second axis (II), in which the second axis (II) is parallel to the first axis (I);
   a first driving device for driving the first arm to rotate about the first axis (I);
   a second arm drive unit with a second driving device for driving the second arm to rotate about the second axis (II), wherein the first driving device and the second driving devices are mounted stationary at and disposed in the base; and
   a linear drive unit for moving the first arm and the second arm in a direction parallel to the first axis (I) and the second axis (II), wherein the linear drive unit comprises a third driving device mounted stationary at and disposed in the base;
   wherein the first arm is mounted to the base by a first column driven to rotate about the first axis (I), wherein the first arm is non-rotatably, but axially displaceably along the first axis (I) coupled to the first column;
   wherein the second arm drive unit comprises a second column driven to rotate about the first axis (I);
   wherein the second arm is linked to the second column by a linkage system comprising at least one rod, which is rotatably about a rod axis (III) parallel to the first axis (I) and axially displaceably mounted on the second column and offset from the first arm and second arm; and
   wherein the linkage system comprises at least one cantilever, which is non-rotatably, but axially displaceably in the axial direction of the second column coupled to the second column and wherein the at least one rod is rotatably about the rod axis (III) and axially fixed coupled to the cantilever.

2. The robotic device according to claim 1, wherein the linear drive unit comprises a threaded rod rotating about a fixed third axis and at least one nut engaging the threaded rod with at least one nut is mounted on the first arm.

3. The robotic device according to claim 2, wherein the third axis is coaxial with the first axis (I).

4. The robotic device according to claim 1, wherein the second column is a hollow profile and wherein the first column is arranged inside the second column, such that the second column is rotatable about the first column.

5. The robotic device according to claim 4, wherein at least one guiding rail extending in parallel to the first axis (I) is provided at the outer surface of the second column and wherein the at least one cantilever is slidingly coupled to the at least one guiding rail.

6. The robotic device according to claim 1, wherein the first column is a hollow profile.

7. The robotic device according to claim 1, wherein the first arm comprises a slider element slidingly mounted in a guiding groove of the first column extending in the direction of the first axis (I) and positively connected to the first column to rotate with the first column.

8. The robotic device according to claim 1, further comprising,
   a work unit attached to the second arm.

9. The robotic device according to claim 8, wherein the work unit is a gripper.

10. The robotic device according to claim 8, wherein the work unit is mounted moveable on the second arm swivelable with respect to the second arm.

11. A laboratory automation system with a number of pre-analytical, analytical and/or post-analytical stations and with a robotic device according to claim 1.

12. The robotic device according to claim 1, further comprising,
    at least one control device, wherein the first driving device, the second driving device, and the third driving device are coordinated by the control device to position the robotic device in Cartesian space.

* * * * *